United States Patent
Fischmann

(10) Patent No.: US 9,470,008 B2
(45) Date of Patent: Oct. 18, 2016

(54) SYSTEM AND METHOD FOR MAINTAINING WATER QUALITY IN LARGE WATER BODIES

(71) Applicant: Crystal Lagoons (Curacao) B.V., Curacao (NL)

(72) Inventor: Fernando Benjamin Fischmann, Vitacura Santiago (CL)

(73) Assignee: Crystal Lagoons (Curacao) B.V., Curacao (NL)

( * ) Notice: Subject to any disclaimer, the term of this patent is extended or adjusted under 35 U.S.C. 154(b) by 0 days.

(21) Appl. No.: 14/564,957

(22) Filed: Dec. 9, 2014

(65) Prior Publication Data
US 2015/0166361 A1    Jun. 18, 2015

Related U.S. Application Data

(60) Provisional application No. 61/915,331, filed on Dec. 12, 2013.

(51) Int. Cl.
*C02F 1/56*    (2006.01)
*E04H 4/12*    (2006.01)
(Continued)

(52) U.S. Cl.
CPC ............. *E04H 4/1281* (2013.01); *C02F 1/008* (2013.01); *C02F 1/40* (2013.01); *C02F 1/52* (2013.01); *C02F 1/5281* (2013.01); *C02F 1/56* (2013.01); *C02F 9/00* (2013.01); *E04H 4/16* (2013.01); *C02F 1/001* (2013.01); *C02F 1/5245* (2013.01); *C02F 1/5263* (2013.01); *C02F 1/5272* (2013.01);
(Continued)

(58) Field of Classification Search
CPC ............................. C02F 1/004; E04H 4/1281
See application file for complete search history.

(56) References Cited

U.S. PATENT DOCUMENTS

| | | |
|---|---|---|
| 2,071,520 A | 2/1937 | Harrison |
| 2,141,811 A | 12/1938 | Everson |

(Continued)

FOREIGN PATENT DOCUMENTS

| | | |
|---|---|---|
| CN | 1256250 | 6/2000 |
| CN | 102092824 | 6/2011 |

(Continued)

OTHER PUBLICATIONS

International Search Report and Written Opinion for International Application No. PCT/IB2014/002891 mailed Apr. 29, 2015 (14 pages).

(Continued)

*Primary Examiner* — Peter Keyworth
(74) *Attorney, Agent, or Firm* — Merchant & Gould P.C.

(57) ABSTRACT

The present application relates to an innovative and optimized method and system for maintaining water quality in water bodies such as excavated inland structures and floating structures with bottoms comprising flexible membranes, using a simplified economic filtration system and degreasing system that requires much smaller filtration equipment than conventional centralized filtration systems and provides for consumption of significantly lower amounts of energy. The method of the invention allows activating a chemical application system, mobile suctioning device, and/or degreasing system based on information regarding turbidity, the color of the bottom of the water body, and amount of greases on the surface water layer of the water body, to adjust the water quality parameters within their limits.

42 Claims, 4 Drawing Sheets

(51) Int. Cl.
*C02F 1/52* (2006.01)
*E04H 4/16* (2006.01)
*C02F 1/00* (2006.01)
*C02F 1/40* (2006.01)
*C02F 9/00* (2006.01)
*C02F 103/00* (2006.01)
*C02F 1/76* (2006.01)
*C02F 103/42* (2006.01)

(52) U.S. Cl.
CPC ............ *C02F 1/76* (2013.01); *C02F 2001/007* (2013.01); *C02F 2103/007* (2013.01); *C02F 2103/42* (2013.01); *C02F 2201/008* (2013.01); *C02F 2209/008* (2013.01); *C02F 2209/06* (2013.01); *C02F 2209/08* (2013.01); *C02F 2209/11* (2013.01); *C02F 2209/15* (2013.01); *C02F 2209/18* (2013.01); *C02F 2209/22* (2013.01); *C02F 2209/29* (2013.01); *C02F 2209/36* (2013.01); *C02F 2209/44* (2013.01); *C02F 2303/04* (2013.01); *C02F 2303/24* (2013.01); *E04H 4/1209* (2013.01); *E04H 4/1654* (2013.01)

(56) References Cited

U.S. PATENT DOCUMENTS

| | | |
|---|---|---|
| 2,314,767 A | 3/1943 | Burrell |
| 2,646,889 A | 7/1953 | August |
| 2,923,954 A | 2/1960 | Babcock |
| 3,132,773 A | 5/1964 | Hampton |
| 3,247,053 A | 4/1966 | Hodge |
| 3,266,631 A | 8/1966 | Snaper |
| 3,317,925 A | 5/1967 | Vance |
| 3,361,150 A | 1/1968 | Horner |
| 3,406,416 A | 10/1968 | Presby et al. |
| 3,412,862 A | 11/1968 | Chaplin |
| 3,419,916 A | 1/1969 | Schankler |
| 3,470,091 A | 9/1969 | Budd et al. |
| 3,540,274 A | 11/1970 | Shore |
| 3,641,594 A | 2/1972 | Hough |
| 3,660,957 A | 5/1972 | Schankler |
| 3,695,434 A | 10/1972 | Whitten, Jr. |
| 3,748,810 A | 7/1973 | Mattingly |
| 3,788,982 A | 1/1974 | Zsoldoes, Jr. et al. |
| 3,844,760 A | 10/1974 | Nelson |
| 3,887,666 A | 6/1975 | Heller et al. |
| 3,949,442 A | 4/1976 | Chandler |
| 3,950,809 A | 4/1976 | Schatzmann |
| 4,055,491 A | 10/1977 | Porath-Furedi |
| 4,060,575 A | 11/1977 | Uhlirsch et al. |
| 4,063,419 A | 12/1977 | Garrett |
| 4,090,266 A | 5/1978 | Price |
| 4,100,641 A | 7/1978 | Pansini |
| 4,117,683 A | 10/1978 | Rasmussen |
| 4,119,535 A | 10/1978 | White |
| 4,129,904 A | 12/1978 | Pansini |
| 4,176,058 A | 11/1979 | Grobler |
| 4,254,525 A | 3/1981 | Combest |
| 4,254,818 A | 3/1981 | Melamed |
| 4,263,759 A | 4/1981 | Miller |
| 4,304,022 A | 12/1981 | Sommer |
| 4,306,967 A | 12/1981 | Trautwein |
| 4,338,697 A | 7/1982 | Broadwater |
| 4,343,696 A | 8/1982 | Hung |
| RE31,087 E * | 11/1982 | Sohl ..................... A23L 1/0156 210/671 |
| 4,402,101 A | 9/1983 | van Zyl |
| 4,464,215 A | 8/1984 | Cogliano |
| 4,519,914 A | 5/1985 | Etani |
| 4,548,371 A | 10/1985 | Dempsey |
| 4,572,767 A | 2/1986 | McCord |
| 4,581,075 A | 4/1986 | St. Martin |
| 4,592,291 A * | 6/1986 | Sullivan, III ........... C02F 1/302 110/221 |
| 4,640,784 A | 2/1987 | Cant |
| 4,652,378 A | 3/1987 | Marikovsky et al. |
| 4,692,956 A | 9/1987 | Kassis |
| 4,752,740 A | 6/1988 | Steininger |
| 4,767,511 A | 8/1988 | Aragon |
| 4,768,532 A | 9/1988 | Johnson |
| 4,776,053 A | 10/1988 | Kiraly |
| 4,835,810 A | 6/1989 | Hugo |
| 4,849,024 A | 7/1989 | Supra |
| 4,880,547 A | 11/1989 | Etani |
| 4,889,622 A | 12/1989 | Newcombe-Bond |
| 4,909,266 A | 3/1990 | Massa |
| 4,931,187 A | 6/1990 | Derham et al. |
| 4,948,296 A | 8/1990 | Salter |
| 4,952,398 A | 8/1990 | Tapin |
| 5,028,321 A | 7/1991 | Stone et al. |
| 5,039,427 A | 8/1991 | Conover |
| 5,106,229 A | 4/1992 | Blackwell |
| 5,107,872 A | 4/1992 | Meincke |
| 5,108,514 A | 4/1992 | Ksiner |
| 5,143,623 A | 9/1992 | Kroll |
| 5,164,094 A | 11/1992 | Stuckart |
| 5,172,445 A | 12/1992 | Chandler |
| 5,245,723 A | 9/1993 | Sommer |
| 5,268,092 A | 12/1993 | Eden |
| 5,293,659 A | 3/1994 | Rief et al. |
| 5,337,434 A | 8/1994 | Erlich |
| 5,342,570 A | 8/1994 | Ledoux et al. |
| 5,346,566 A | 9/1994 | White |
| 5,398,361 A | 3/1995 | Cason |
| 5,411,889 A * | 5/1995 | Hoots ..................... G01N 33/18 210/745 |
| 5,422,014 A | 6/1995 | Allen et al. |
| 5,454,129 A | 10/1995 | Kell |
| 5,569,371 A | 10/1996 | Perling |
| 5,616,239 A | 4/1997 | Wendell et al. |
| 5,662,940 A | 9/1997 | Hight et al. |
| 5,782,480 A | 7/1998 | Phillips |
| 5,802,631 A | 9/1998 | Friedman |
| 5,833,841 A | 11/1998 | Koslowsky |
| 5,842,243 A | 12/1998 | Horvath et al. |
| 5,985,156 A | 11/1999 | Henkin et al. |
| 6,017,400 A | 1/2000 | Clark et al. |
| 6,149,819 A | 11/2000 | Martin et al. |
| 6,224,826 B1 | 5/2001 | Katakura et al. |
| 6,228,272 B1 | 5/2001 | Gola |
| 6,231,268 B1 | 5/2001 | Hausenbauer |
| 6,280,639 B1 | 8/2001 | Ortiz |
| 6,284,144 B1 | 9/2001 | Itzhak |
| 6,303,038 B1 | 10/2001 | Sanders et al. |
| 6,317,901 B1 | 11/2001 | Corpuel |
| 6,358,409 B1 * | 3/2002 | Jacoby, Jr. ......... B01D 17/0214 210/122 |
| 6,409,926 B1 | 6/2002 | Martin |
| 6,419,840 B1 | 7/2002 | Meincke |
| 6,444,176 B1 | 9/2002 | Yoshinaga et al. |
| 6,539,573 B1 | 4/2003 | Caccavella |
| 6,620,315 B2 | 9/2003 | Martin |
| 6,896,799 B2 | 5/2005 | Ohanian |
| 7,163,619 B2 | 1/2007 | Wang |
| 7,189,314 B1 | 3/2007 | Pace et al. |
| 7,252,843 B2 | 8/2007 | Moore et al. |
| 7,820,055 B2 * | 10/2010 | Fischmann Torres .... C02F 1/00 210/709 |
| 7,832,959 B1 | 11/2010 | Groen et al. |
| 7,862,712 B2 | 1/2011 | Tak |
| 8,153,010 B2 | 4/2012 | Duarte et al. |
| 8,388,837 B2 | 3/2013 | Tormaschy et al. |
| 8,454,838 B2 | 6/2013 | Fischmann T. |
| 8,465,651 B2 | 6/2013 | Fischmann T. |
| 8,518,269 B2 | 8/2013 | Fischmann T. |
| 8,524,088 B2 | 9/2013 | Arbogast et al. |
| 2002/0117430 A1 | 8/2002 | Navarro et al. |
| 2003/0046933 A1 | 3/2003 | Moss et al. |
| 2003/0091467 A1 | 5/2003 | Kmec et al. |
| 2003/0094421 A1 | 5/2003 | Gargas |
| 2003/0228195 A1 | 12/2003 | Mizutani |
| 2004/0025269 A1 | 2/2004 | Pichon |
| 2004/0129644 A1 | 7/2004 | Unhoch |

(56) References Cited

U.S. PATENT DOCUMENTS

| | | | |
|---|---|---|---|
| 2004/0211450 A1 | 10/2004 | Stoltz | |
| 2004/0217326 A1 | 11/2004 | Souter et al. | |
| 2004/0226896 A1 | 11/2004 | Lovestead et al. | |
| 2005/0009192 A1 | 1/2005 | Page | |
| 2005/0016906 A1 | 1/2005 | Gettman | |
| 2005/0063782 A1 | 3/2005 | Stoecker et al. | |
| 2005/0091934 A1* | 5/2005 | Kantor | E04H 4/0043 52/155 |
| 2005/0145552 A1 | 7/2005 | Sheets | |
| 2005/0194322 A1 | 9/2005 | Palmer | |
| 2005/0207939 A1 | 9/2005 | Roussi et al. | |
| 2006/0054568 A1 | 3/2006 | Jones et al. | |
| 2006/0169322 A1 | 8/2006 | Torkelson | |
| 2006/0174430 A1 | 8/2006 | Pareti | |
| 2006/0283808 A1 | 12/2006 | Kadlec et al. | |
| 2007/0059562 A1 | 3/2007 | Hattori et al. | |
| 2007/0181498 A1 | 8/2007 | Kaas | |
| 2007/0181510 A1 | 8/2007 | Harvey et al. | |
| 2008/0116142 A1 | 5/2008 | Fischmann Torres | |
| 2008/0295615 A1 | 12/2008 | Sihalla | |
| 2009/0050572 A1 | 2/2009 | McGuire et al. | |
| 2009/0087549 A1 | 4/2009 | Zhou et al. | |
| 2010/0320147 A1 | 12/2010 | McGuire et al. | |
| 2011/0009019 A1 | 1/2011 | Neira et al. | |
| 2011/0061194 A1 | 3/2011 | Fischmann Torres | |
| 2011/0062067 A1 | 3/2011 | Fischmann Torres | |
| 2011/0132815 A1 | 6/2011 | Angellili et al. | |
| 2011/0137465 A1* | 6/2011 | Angelilli | C02F 1/763 700/271 |
| 2011/0210076 A1 | 9/2011 | Fischmann Torres | |
| 2012/0024794 A1* | 2/2012 | Fischmann T. | B01D 21/30 210/665 |
| 2012/0024796 A1* | 2/2012 | Fischmann T. | C02F 1/004 210/697 |
| 2014/0190897 A1* | 7/2014 | Wilson | C02F 1/24 210/704 |

FOREIGN PATENT DOCUMENTS

| | | |
|---|---|---|
| DE | 2 141 460 | 2/1973 |
| DE | 38 44 374 | 7/1990 |
| DE | 19515428 | 11/1996 |
| DE | 297 16 994 | 1/1998 |
| DE | 198 14 705 | 10/1998 |
| DE | 198 60 568 | 12/1998 |
| DE | 10 2010 019 510 | 11/2011 |
| EP | 0 352 487 | 1/1990 |
| EP | 0 468 876 | 1/1992 |
| EP | 0 483 470 | 5/1992 |
| EP | 1 420 130 | 5/2004 |
| EP | 168 85 62 | 8/2006 |
| ES | 200 14 29 | 5/1998 |
| FR | 2 544 005 | 10/1984 |
| FR | 2 668 527 | 4/1992 |
| FR | 2 685 374 | 6/1993 |
| FR | 2 740 493 | 4/1997 |
| FR | 2 785 898 | 5/2000 |
| GB | 1494005 | 12/1977 |
| GB | 2045606 | 11/1980 |
| GB | 2 243 151 | 10/1991 |
| JP | 59-012287 | 1/1984 |
| JP | 59-222294 | 12/1984 |
| JP | 4-115008 | 4/1992 |
| JP | 5-220466 | 8/1993 |
| JP | 04073612 | 8/1993 |
| JP | 5-261395 | 10/1993 |
| JP | 7-310311 | 11/1995 |
| JP | 3026643 | 1/1996 |
| JP | 10-169226 | 6/1998 |
| JP | 2001-3586 | 1/2001 |
| JP | 2001-9452 | 1/2001 |
| JP | 2002-90339 | 3/2002 |
| JP | 2002-282860 | 10/2002 |
| JP | 2003-190989 | 7/2003 |
| JP | 2003-200173 | 7/2003 |
| JP | 2004-958 | 1/2004 |
| JP | 2005-288392 | 10/2005 |
| JP | 2006-68624 | 3/2006 |
| JP | 2007-500073 | 1/2007 |
| JP | 2011-5463 | 1/2011 |
| KR | 20-0162956 | 9/1999 |
| TW | 432013 | 8/1987 |
| TW | 482186 | 12/1990 |
| UY | 30184 | 5/2007 |
| WO | WO 8101585 | 6/1981 |
| WO | WO 9848132 | 10/1998 |
| WO | WO 03/010388 | 2/2003 |
| WO | WO 2006/069418 | 7/2006 |
| WO | WO 2007/029277 | 3/2007 |
| WO | WO 2007/059562 | 5/2007 |
| WO | WO 2009/114206 | 9/2009 |
| WO | WO 2010/074770 | 7/2010 |

OTHER PUBLICATIONS

African Regional Intellectual Property Organization (ARIPO) report for corresponding application No. AP/P/2007/004242 dated Dec. 7, 2010.
Ballentine, "Ambient Water Quality Criteria for Bacteria—1986", Jan. 1986, United States EPA, EPA440/5-84-002, p. 16.
Chilean Examiner's report from Application No. 3900-08 issued Aug. 31, 2009.
Communication from EPO for corresponding application No. 09835402.0 dated Jan. 30, 2013.
Eurasian Office Action for corresponding application No. 201001477/31 and response to Office Action dated Apr. 2, 2013 with English Translation.
European Search Report from European Application No. 07 07 5995 mailed Mar. 9, 2010.
International Search Report and Written Opinion for International Application No. PCT/US2011/051129 mailed Feb. 8, 2012.
International Search Report and Written Opinion for International Application No. PCT/US2011/051236 mailed Jan. 26, 2012.
International Search Report and Written Opinion for International Application No. PCT/US2011/051244 mailed Jan. 25, 2012.
International Search Report and Written Opinion for PCT/EP2012/076170 mailed Aug. 5, 2013.
International Search Report mailed May 6, 2009, in co-pending related PCT Application No. PCT/US2009/036809.
Japanese Office Action for corresponding application No. 2007-299975 dated May 31, 2011—translation provided.
Norwegian Search Report from Norwegian Application No. 20075880 dated Feb. 4, 2010.
Panama Search Report from Panama Application No. 88509-01 dated Oct. 7, 2010.
Peruvian Technical Report for corresponding application No. 000244-2007 dated Sep. 2, 2010—translation provided.
Response filed for EP 09835402.0 dated Aug. 14, 2013. (9 pages).
Response filed for EP 09835402.0 dated Jul. 23, 2013. (11 pages).
Second Singapore Office Action for corresponding application No. 200717963-3 dated Dec. 23, 2010.
Singapore Office Action for corresponding application No. 200717963-3 dated Dec. 23, 2010.
World Health Organization: Guidelines for safe recreational waters. vol. 2. Swimming pools and similar recreational water environments. Switzerland. Jun. 27, 2006 ISBN 92-4-154680-8 Chapter 4.
World Health Organization: Guidelines for safe recreational waters. vol. 2. Swimming pools and similar recreational water environments. Switzerland. Jun. 27, 2006 ISBN 92-4-154680-8 Chapter 5.

* cited by examiner

SYSTEM AND METHOD FOR MAINTAINING WATER QUALITY IN LARGE WATER BODIES

This application claims benefit of U.S. Provisional Ser. No. 61/915,331, filed 12 Dec. 2013 and which application is incorporated herein by reference. To the extent appropriate, a claim of priority is made to the above disclosed application.

FIELD

The present invention relates to an innovative and optimized system and method for maintaining water quality in large artificial excavated inland water bodies or floating structures using a simplified economic filtration system and degreasing system that requires much smaller filtration equipment than conventional centralized filtration systems and provides for consumption of significantly lower amounts of energy, where the method for maintaining water quality is based on the color of the bottom of the body of water, the amount of surface greases and turbidity of the water. U.S. Pat. No. 8,518,269, No. 8,062,514, No. 8,070,942, No. 7,820,055, No. 8,454,838, No. 8,465,651, No. 8,518,269, No. 8,070,342, and U.S. Patent Application Publication No. 20110110076, 20110108490, No. 20130240432, No. 20130264261, No. 20130213866, No. 20130306532, and No. 20110210076, are hereby incorporated by reference in its entirety.

BACKGROUND

Water in swimming pools is usually filtered and treated with chemicals to maintain the quality of water within suitable levels and in compliance with local regulations. Filtration systems are designed to eliminate, e.g., suspended solids, including microbial and algal growth, floating debris, and oil and greases in the water. Conventional systems for maintaining water quality in swimming pools typically involve large centralized filtration systems that are expensive to construct and to operate. A conventional centralized filtration system is usually configured to filter the entire volume of water in a pool from about 1 to 6 times per day. The operation of such centralized filtration systems is energy intensive and causes swimming pools to have a large carbon footprint and limits the maximum size of conventional swimming pools.

Water is typically directed to the centralized filtration system from three sources: the main body of water in the pool; water suctioned from the bottom of the pool containing settled impurities; and water drawn from the surface of the pool by skimmers. All three sources are treated by the same centralized filtration system regardless of different levels and types of impurities. In addition, conventional centralized filtration systems operate according to certain defined periods of time, or for certain amount of hours a day without taking into account the real time condition of the water being treated and/or without adjusting operational parameters and filtration requirements to optimize efficiency of the system in view of the real time condition of the water being treated.

Conventional centralized pool filtration systems therefore have high equipment costs and consume large amounts of energy to complete such filtration requirements. The Association of Pool and Spa Professionals estimates that there are more than 5.5 million swimming pools in the United States equipped with conventional centralized filtration systems. According to the U.S. Department of Energy, conventional pool filtration systems are very energy intensive, using up to 3,000 kWh of electricity per year, the equivalent of about 30% of an average household's electricity consumption, as per the Energy Information Administration. The California Energy Commission estimates that a typical backyard swimming pool in California can use enough energy during the summer season as would be needed to power an entire home for three months. Reducing the amount of energy needed for filtration would provide savings in the cost of maintenance of the pools and also reduce $CO_2$ emissions.

The cost and high energy demand of operating a pool with conventional centralized filtration systems has caused closures of some large public swimming pools around the world. For example, according to the Japan Times, the "Ocean Dome" indoor swimming pool located in Japan (which holds the Record Guinness as the largest indoor swimming pool in the world, with over 1 hectare of water surface) had to be closed in 2007 due to high operational costs. Another example is the "Fleishhacker Pool" located in California, with a surface of 1.5 hectares, which had to be closed on 1971 due to water quality problems and high costs.

With a trend toward more sustainable and ecological practices, regulatory agencies throughout the world are enacting regulations that aim to lower energy consumption and reduce $CO_2$ emissions of swimming pool operations. Because of the need for lower energy consumption and more cost effective filtration systems, it is desirable to have a method that is capable of maintaining water quality at a lower capital and operating cost. A trend toward more sustainable operations is also driving the need for more energy efficient systems and methods for maintaining water quality in large water bodies, such as swimming pools.

PREVIOUS ART

Turbidity of water can be used as a measure of water quality. Turbidity is caused by microscopic suspended solid particles that result in "cloudiness" of the water. The particles may include many different types of impurities, such as inorganic and organic particles, microbes, and algal growth. Turbidity of water can be reduced, for example, by filtration or by causing the particles to agglomerate or react with chemicals, making them heavy enough to settle to the bottom. U.S. Pat. No. 4,747,978 discloses a method of disinfecting swimming pool water by use of calcium hypochlorite compositions including an inorganic flocculant (e.g., aluminum sulfate) that can provide improved clarity upon addition to a body of water, e.g., a swimming pool. The '978 patent discloses that water clarity can be improved by the simultaneous settling of organic materials and suspended solids due to the addition of the flocculant, but at the same time discourages the use of too much flocculant in order to avoid plugging the filtration system. Also, such method requires filtration of the complete water volume.

Chinese patent publication CN2292798 discloses a water circulation treatment and underwater dirt collecting device for a swimming pool including a treating and circulating water discharging impurities. The '798 publication discloses adding flocculant, algaecide sterilizing agent and pH regulating agent to the water, filtering the water and returning the water back to the swimming pool. The dirt is suctioned from the bottom of the pool by a dirt collecting disc which moves along the bottom, and the sediment accumulated at the bottom of the pool is discharged out of the pool. However, even in this treatment system, the entire body of water is filtered. The '798 publication does not address the issues associated with high filtration volumes and does not disclose controlling the operation of the suctioning system or the filtration system based on observed water quality parameters. The '798 publication also fails to address the treatment of skimmed water that is typically sent through the centralized filtration system, thus adding to the total filtration volume.

SUMMARY

The optimized system and method of the present invention replaces conventional centralized filtration systems from traditionally configured swimming pools with a simplified economic filtration system and degreasing system that consumes up to two orders of magnitude less energy, and requires much smaller filtration equipment than conventional filtration systems. The method replaces the three filtration requirements from conventional centralized filtration systems used in swimming pools, which are: the filtration of the entire body of water contained in the swimming pool; the filtration of the water suctioned from the bottom that contains settled impurities; and the filtration of the surface water drawn by a skimmer system. In such a conventional system, the three water flows are sent to the same centralized filtration system in order to remove suspended solids, floating debris and greases.

The disclosed system and method provide for a significantly lowered need for filtration capacity by suctioning a small water flow from the bottom of the large water body (e.g., a pool) that contains settled impurities, thus avoiding filtration of the entire body of water and the centralized filtration of skimmed water is replaced by screening of debris and skimming of oil and grease. The system and method of the invention allows activating the operation of specific systems based on the received information regarding different water quality and physicochemical parameters. These parameters often include turbidity, the color of the bottom of the water body, and amount of greases on the surface water layer of the water body, which can be directly or indirectly measured, empirically estimated, determined according to experience, based on sensorial methods, or calculated. The chemical application system, mobile suctioning device, and degreasing system are each operated only when needed based on the actual need for filtration or purification dictated by the quality and physicochemical parameters of the water in the water body, such as turbidity of the water, amount of settled impurities, and/or amount of greases or oils on the surface water layer of the water body, rather than a pre-set schedule or required filtration rates as in conventional centralized swimming pool filtration systems.

The method additionally provides for adding a chlorine-based additive to the water to maintain a minimum free residual chlorine level in the water body or in a specific bathing zone, where such minimum free residual chlorine concentration is considerably lower than conventional concentrations used in swimming pools as the large water bodies from the present invention have large water volumes that provide an additional dilution effect. The minimum free residual chlorine level from the present invention is based on the WQI which comprises a group of variables that are not usually applied in small water volumes such as swimming pools.

The method for treating a large water body generally includes applying an effective amount of a flocculant to water in the water body to maintain turbidity of the water below 2 NTU, wherein the flocculant flocculates impurities in the water into particles that settle to the bottom of the water body; operating a mobile suctioning device to maintain the increase in the black component of the bottom's color below about 30%, wherein the mobile suction device suctions a portion of water from the bottom of the water body containing settled particles; filtering the water suctioned by the mobile suction device and returning the filtered water to the water body, wherein the water suctioned by the mobile suction device does not exceed about 10% of the total water volume of the water body in a 24 hour interval; and activating operation of a degreasing system to maintain a surface water layer having less than about 20 mg/L of floating greases, wherein greases from a surface water flow into the degreasing system are removed by a separation unit comprising a degreaser and the treated water is returned to the water body.

In an embodiment, the system includes a control system that can activate the operation of the chemical application system, mobile suctioning device, and/or degreasing system based on received water quality and physicochemical parameters including turbidity, the color of the bottom of the water body, and amount of greases on the surface water layer of the water body, to adjust the water quality and physicochemical parameters within predetermined limits.

The system for maintaining water quality in a large water body generally includes a chemical application system for dosing a flocculant into the water, wherein the chemical application system is activated to apply flocculants to the water in the water body to maintain turbidity of the water below 2 NTU, and for optionally applying a chlorine based additive to maintain a minimum free residual chlorine level in the water; a mobile suctioning device capable of moving along the bottom of the water body and suctioning a portion of water from the bottom containing settled solids, where the mobile suctioning device is activated when the bottom's color black component increases more than 30% on a CMYK scale; a filtration unit in fluid communication with the mobile suctioning unit, wherein the filtration unit receives the portion of water suctioned by the mobile suction unit; a degreasing system for providing a surface water flow from the water body to the separation unit, wherein the degreasing system is activated to maintain a surface water layer having less than about 20 mg/L of floating greases; and one or more return lines for returning filtered water from the filtration unit and the degreasing system to the water body.

DETAILED DESCRIPTION

Figure 1:
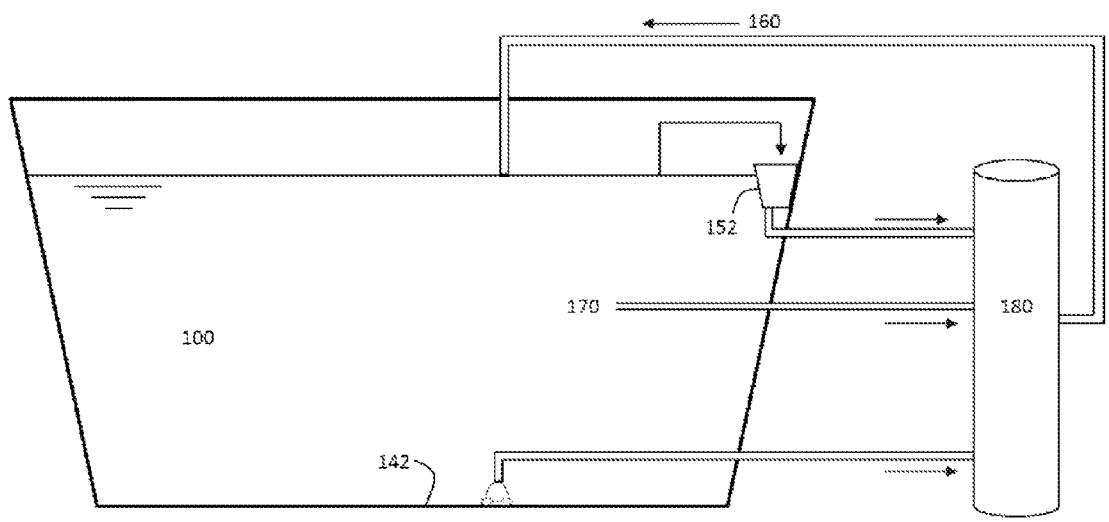
FIG. 1 shows an example of a conventional centralized filtration system.

The following detailed description refers to the accompanying drawings. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention. While systems and methods are described in terms of "comprising" various apparatus or steps, the systems and methods can also "consist essentially of" or "consist of" the various apparatus or steps, unless stated otherwise. Additionally, the terms "a," "an," and "the" are intended to include plural alternatives, e.g., at least one, unless stated otherwise. For instance, the disclosure of "a disinfectant agent," "an inlet line," "a mobile suction device," etc., is meant to encompass one, or more than one, disinfectant agent, inlet line, mobile suction device, etc., unless otherwise specified.

Conventional centralized filtration systems in swimming pools typically require filtration of the entire body of water about 1 to 6 times per day. In such filtration systems, water from different sources, such as intake pipes, suctioning devices, drains, skimmers, and overflow is collected and sent to a centralized filter.

The present invention is directed to a method and system for treating large water bodies, where the large water bodies can be artificially constructed on land such as excavated structures, or floating structures installed within natural or artificial lakes, ponds, basins, rivers, the sea, or others. The term "water body" as used herein refers to any body of water, either artificially constructed on land or a floating structure, generally capable of being used for recreational use or for sports, including pools, lagoons, tanks, lakes, water features, artificial ponds, artificial lakes, floating lagoons, and the like. The large water bodies of the present invention generally have a water surface area of at least about 7,000 $m^2$. In some embodiments the large water body may have a surface area of 20,000 $m^2$, 40,000 $m^2$, 100,000 $m^2$, or more.

The water body can be constructed with characteristics that are suitable for performing the method of the present invention, where the bottom comprises a non-porous flexible material such as a flexible membrane. Such non-porous flexible material is not used generally for conventional concrete swimming pools, but it is used for large water bodies such as retention and irrigation ponds, and for example small kids above ground pools, and other large water bodies due to its flexibility that allows for easier installation and provides structural advantages compared with non-flexible materials such as concrete used in conventional swimming pools, also having lower costs.

The non-porous flexible material preferably comprises a liner, such as a membrane or plastic liner, and may have a thickness in the range of about 0.1 mm to about 5 mm. Examples of suitable materials include, but are not limited to, rubbers, plastics, Teflon, low density polyethylene, high density polyethylene, polypropylene, nylon, polystyrene, polycarbonate, polyethylene terephthalate, polyamides, PVC, acrylics, and combinations thereof. In other embodiments, the liner can be constructed of composite materials. According to embodiments, the liner allows avoiding adherence of settled impurities produced by the method's processes or natural falling debris, dust, pollen, or other suspended solids that fall into the bottom of the water body.

In an embodiment, the method and system from the present invention is used on artificially constructed inland water bodies. In order to build such water bodies, earthworks may be required to excavate a hole in the ground to generate a desired depth for the water body. The non-porous flexible material (e.g., a membrane or plastic liner) may be installed on the bottom of the excavated water body. The non-porous material can be thermo fused, or an extruded HDPE concrete embedment strip can be used for liner attachment to provide an even layer in the bottom and provide the non-permeable properties to the bottom of the water body.

Earthworks and soil compaction may be used to provide slopes within the water body (e.g., a sloping bottom). According to an embodiment, the slope of the bottom is preferably no greater than 20% in order to allow a mobile suctioning device to move along the bottom of the water body.

The walls of the water body may be sloped or vertical. In an embodiment, the slope of the walls is no less than about 45% in order to avoid attachment of settling solids, debris, or other impurities on the walls. Preferably, the slope of the walls of the water body are greater than about 60% in order to avoid any accumulation of settled solids, debris, and the like on the walls. In an embodiment, the slope of the walls is greater than about 80%. In another embodiment, the slope of the walls is greater than about 90%.

The soil conditions in the location where the water body is constructed preferably allow for generating a compacted soil with low permeability. During construction of the water body, the soil may be compacted more or less depending on the particle size of the soil. Soil compaction can be measured as a percentage of the relative density (RD) of the soil or as a percentage of the soil's most dense state, the maximum dry density (MDD). Relative density of the soil and methods used to calculate relative density are defined in ASTM D4254-00 (2006). The maximum dry density (MDD) of the soil can be determined according to a modified proctor compaction test according to ASTM D1557-12. The compacted soil should attain a degree of compaction based on a mesh test of No 200 with an opening of 0.075 mm.

According to an embodiment, if the amount of soil passing through the N 200 mesh (the "passage rate") is less than 12%, the soil should be compacted to at least about 80% of its relative density (RD). If the amount of soil passing through the No 200 mesh is 12% or higher, the soil should be compacted to at least about 85% of its maximum dry density (MDD).

The natural terrain may also be leveled to accommodate the water body and related equipment and facilities. The top layer of the natural terrain may contain organic matter and may be removed to avoid using such soil for compaction and structuring the slopes. Preferably, the removed layer of soil is at least 5 cm, more preferably at least 10 cm, and most preferably at least 25 cm. The walls of the excavated water bodies can be built out of soil and can be reinforced with concrete or other materials, or can be built out of structural materials such as concrete or others, which may provide structural stability to the water body. In an embodiment, the walls of the water body may also comprise non-porous flexible membranes.

FIG. 1 shows a typical example of a conventional centralized filtration system for a water body. In the conventional centralized filtration system, water is drawn from three separate sources: a main body of water 170; water from the bottom of the water body 142 containing settled impurities; and surface water from skimmers 152. The water drawn from all three sources is sent through a centralized filter 180 and after filtration sent back into the pool 100 through a return line 160. Because of the high volume of filtration required, the cost of operating such filtration systems is high. Filtration of the water in a conventional filtration system is not based on observed requirements but is usually operated continuously at a set rate or for set periods of time throughout the day without regard to actual water quality. Surface water drawn by skimmers is filtered in the centralized filtration system regardless of the fact that oil, grease and floating debris may be removed by more efficient means and without filtration.

In some existing systems the skimmers perform a double function, where the water drawn from both the surface water and the main body of water 170 are drawn through the skimmer system 152 to be sent into the centralized filter 180. In this case, the surface water and main body of water are drawn through the skimmer system, and the result of the two water flows is sent into the centralized filter 180. Therefore, the skimmers cover a double function of renovating the water by filtering the total water volume from 1 to 6 times per day and also removing floating surface impurities. However, while the two water flows (surface water and main water body) are drawn through the skimmers, the total water flow and filtered water volume remains unchanged as the filtration requirements for the centralized filter still include the filtration of the total water body from 1 to 6 times per day, and therefore the centralized filter would still be required to have a very large capacity, and hence a very large energy consumption. Also, the filtration requirements of the surface water are usually completely different than the filtration requirements for the main water body. If for example, just the surface water was filtered, the amount of energy consumption for filtration would be reduced by 2 orders of magnitude compared to filtering the surface water together with the main water body from 1 to 6 times per day.

The present invention includes a method and system for maintaining water quality that provides for elimination of the large centralized filtration system in water bodies. The system of the invention includes a chemical application system, mobile suctioning device, filtration system, and/or degreasing system that are activated based on the information received regarding specific water quality and physico-chemical parameters such as turbidity, the color of the bottom of the water body, and amount of greases on the surface water layer.

According to a method of the present invention, a chemical agent, such as a flocculant, can be added to prevent the turbidity of the water from exceeding a predetermined Nephelometric Turbidity Unit (NTU) value. The term "flocculant" as used herein refers to a chemical agent or composition that promotes or induces agglomeration, coagulation, or flocculation of impurities, such as suspended solids, organic matter, inorganic matter, bacteria, algae, and the like, in the water body into particles or "floccules" which then settle to the bottom of the water body. As used herein, the term "settled impurities" refers to the particles, floccules, or other debris such as dust, pollen, and the like, that have settled to the bottom of the water body. A mobile suctioning device capable of moving along of the bottom of the water body, can be activated to remove settled particles from the bottom of the water body. The mobile suctioning device can be used in the bottom of the water bodies, where such bottoms comprise a non-porous flexible liner, such as a membrane or plastic liner as described herein.

The water bodies may be artificially constructed inland as excavated structures or floating structures installed within large lakes, basins, ponds, rivers, the sea, or others. In an embodiment, the mobile suctioning device is supported over brushes to avoid damaging the bottom of the land-based artificially constructed excavated structures or of the floating structure. In an embodiment, the suctioning device is a self-propelled device. In another embodiment, the suctioning device allows concentration of suctioning power at suction points distributed along the bottom of the device, which allows avoiding re-suspension of the settled solids and debris found on the bottom of the water bodies, and therefore providing higher suctioning efficiency. In an embodiment, the suctioning device is capable of cleaning at a surface cleaning rate of 10,000 m2 per 24 hours.

The mobile suctioning device suctions a portion of the water from the bottom of the water body containing the settled particles. A filtration unit in fluid communication with the mobile suction device can receive the suctioned water flow from the mobile suctioning device and filter the water, which is then returned to the water body. The timing of the suctioning and filtration of water containing settled particles from the bottom of the water body can be based on actual need and not according to certain defined periods of time or certain amount of hours per day as in a conventional centralized filtration system.

Also, it must be noted that conventional swimming pools require maintaining high and permanent residual chlorine levels to allow proper disinfection in case contamination enters the swimming pools, as swimming pools have small water volumes. On the other hand, the present invention provides an innovative method where the minimum residual chlorine level is based on the Water Quality Index, which allows incorporating different variables that are applicable to large water bodies to determine its water quality and therefore estimate the minimum free chlorine level. This allows providing a minimum residual chlorine level that is considerably lower than for conventional swimming pools, as the quality of large water bodies can be assessed through different parameters not usually applied for conventional swimming pools, and also since large water bodies provide an additional dilution effect which allows maintaining lower chlorine concentrations than for conventional small sized swimming pools.

The Water quality index (WQI) is a dimensionless number that allows combining different water quality parameters into a single index by normalizing values to subjective rating curves. The WQI has been used for evaluating the quality of water of large water bodies such as lakes, lagoons, rivers and others, and factors included in the WQI can be modified depending on the designated water use of the water body or specific preferences. The NSF (National Sanitation Foundation) Water Quality Index can be determined by using eight common water quality parameters including dissolved oxygen, fecal coliform bacteria, pH, 5-day BOD (biochemical oxygen demand), total phosphorus, nitrate-nitrogen, turbidity, and total dissolved solids or may be determined through empirical methods, algorithms based on experience, and analytical methods. The WQI takes the complex scientific information of these variables and synthesizes into a single number.

The water quality of the assessed water body as determined by WQI can range from good, fair, to poor water quality. In an embodiment, the Water Quality Index can be determined by weighting the parameters to allow proper influence in the index:

TABLE 1

Weights applied to WQI Parameters

| Parameter | WQI Weight |
| --- | --- |
| Dissolved Oxygen | 0.17 |
| Fecal Coliform Density | 0.16 |
| pH | 0.11 |
| $BOD_5$ | 0.11 |
| Nitrates | 0.10 |
| Total Phosphates | 0.10 |
| Turbidity | 0.08 |

TABLE 1-continued

Weights applied to WQI Parameters

| Parameter | WQI Weight |
|---|---|
| Total Dissolved Solids | 0.07 |
| Temperature Change | 0.10 |

The weights can be adjusted so that they add up to 1 in case the number of factors is not 9. Generally, the ranges for evaluating the WQI are as follows:

TABLE 2

WQI Ranges

| WQI | Rating |
|---|---|
| 90-100 | Excellent Water Quality |
| 70-90 | Good Water Quality |
| 50-70 | Poor Water Quality |
| 25-50 | Very Poor Water Quality |
| 0-25 | Very bad water quality |

Turbidity, oxygen demand, nutrients, and bacterial counts allow for assessing the water quality of the specific water body that is being analyzed in order to provide proper treatment.

Application of a chlorine-based additive is activated in order to maintain at least a minimum free residual chlorine level. In an embodiment of the invention, the activation of the application of a chlorine-based additive is done through a control system. In an embodiment, application of a chlorine based additive is activated to maintain a minimum free residual chlorine level, where the minimum free residual chlorine level cannot be lower than the value resulting from the following equation:

Minimum Free Residual Chlorine Level=(0.3−0.002(WQI−100))ppm

An exemplary water quality analysis is presented in Table 3 below:

TABLE 3

Example

| Parameter | Measured Value | Normalized Q Value (From WQI Definition) |
|---|---|---|
| Dissolved Oxygen | 40% Saturation | 30 |
| Fecal Coliform Density | 2 NMP/100 ml | 91 |
| pH | 8 | 84 |
| $BOD_5$ | 5 mg/L | 56 |
| Nitrates | 10 mg/L | 51 |
| Total Phosphates | 1.1 mg/L | 40 |
| Turbidity | 0.3 NTU | 98 |
| WQI | 63 | Based on 7 factors |

The weights are adjusted for 7 factors. The calculated WQI index is 63, and the minimum free chlorine level in the water may be calculated as follows:

Minimum Free Residual Chlorine Level=(0.3−0.002(63−100))ppm

Minimum Free Residual Chlorine Level=0.374ppm

According to an embodiment, the minimum amount of chlorine in the water is maintained at or above the level determined by the above calculation.

If required, the level of free residual chlorine may be determined through many different methods, including empirical methods, analytical methods, algorithms based on experience, sensorial methods, and regulatory requirements. In one embodiment, the free residual chlorine level is not lower than the value resulting from the equation for determining minimum free residual chlorine level as disclosed above. In an embodiment, the minimum residual chlorine level is maintained continuously in the water. For example, the minimum residual chlorine level is maintained continuously in the water for a period to time, such as for a week or months at a time, for operation during daylight, or for the duration of a swimming season. In another embodiment, the minimum residual chlorine level is maintained while the water body is in use.

The method of the invention further provides a degreasing system that replaces the centralized filtration of skimmed water in a conventional centralized filtration system. Operation of the degreasing system of the method of the invention is typically based on the amount of greases found on the surface water layer, which in combination with application of the chemical agent to regulate turbidity of the water body, and the timing of the suctioning and filtration of the portion of water containing settled particles from the bottom of the water body based on actual need, provides a method capable of maintaining water quality without complete filtration of the water body.

Figure 2:
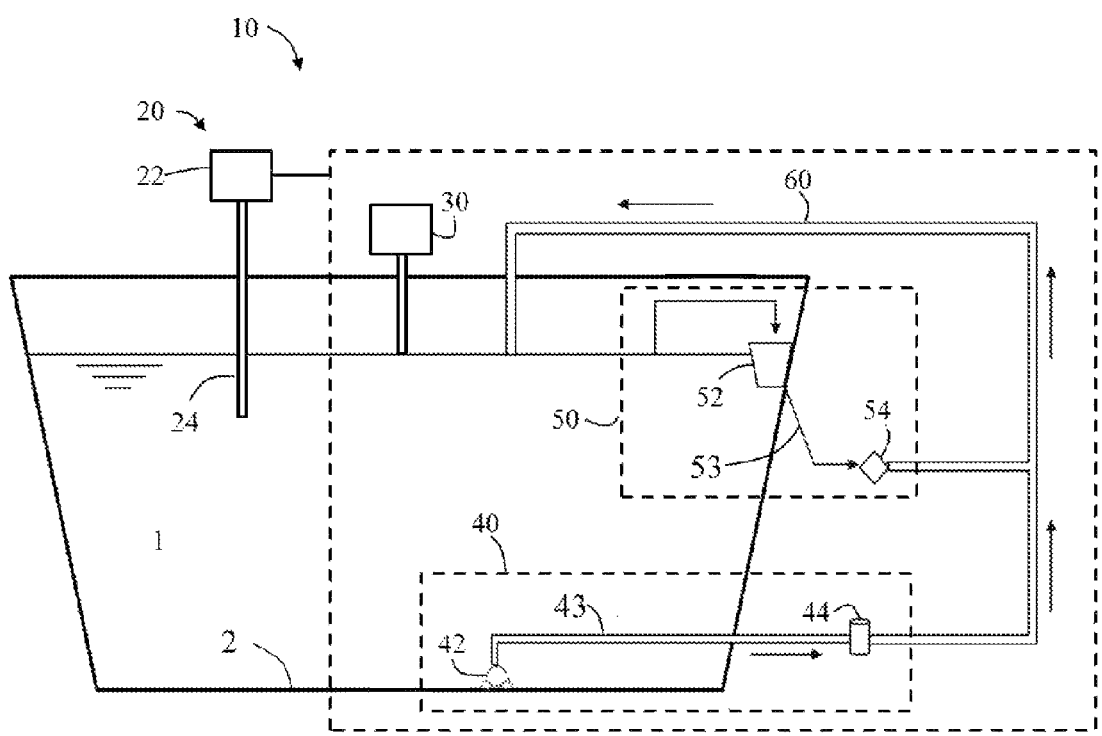
FIG. 2 shows an embodiment of a system for maintaining water quality in a pool.
Figure 3:
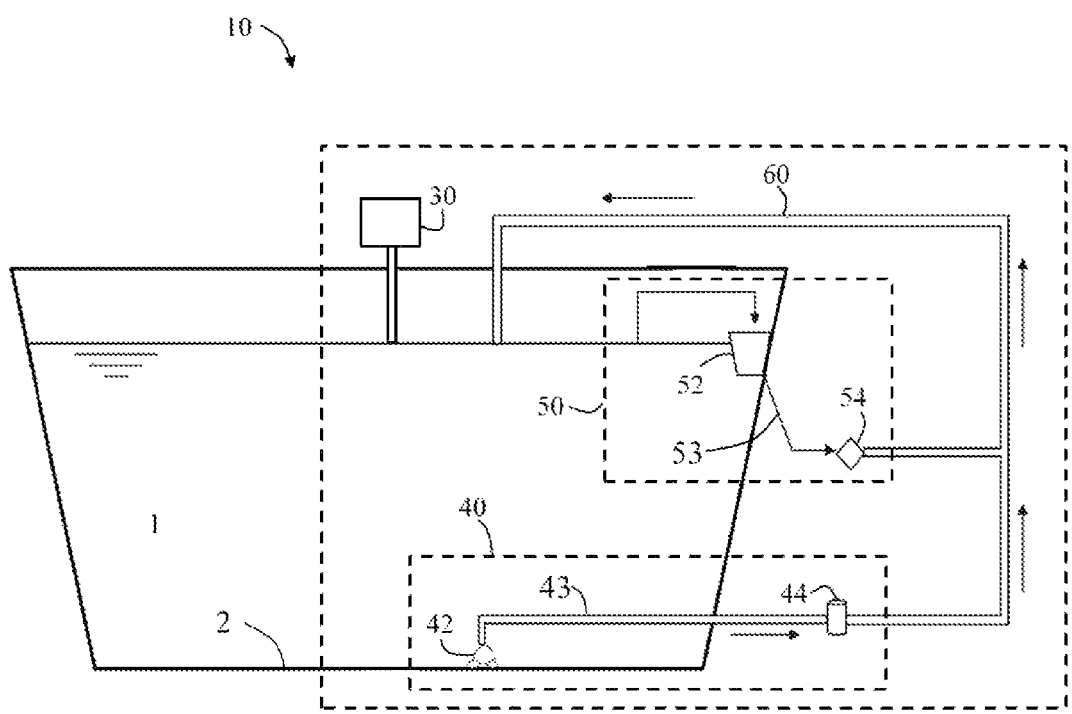
FIG. 3 shows an embodiment of the system of FIG. 2.
Figure 4:
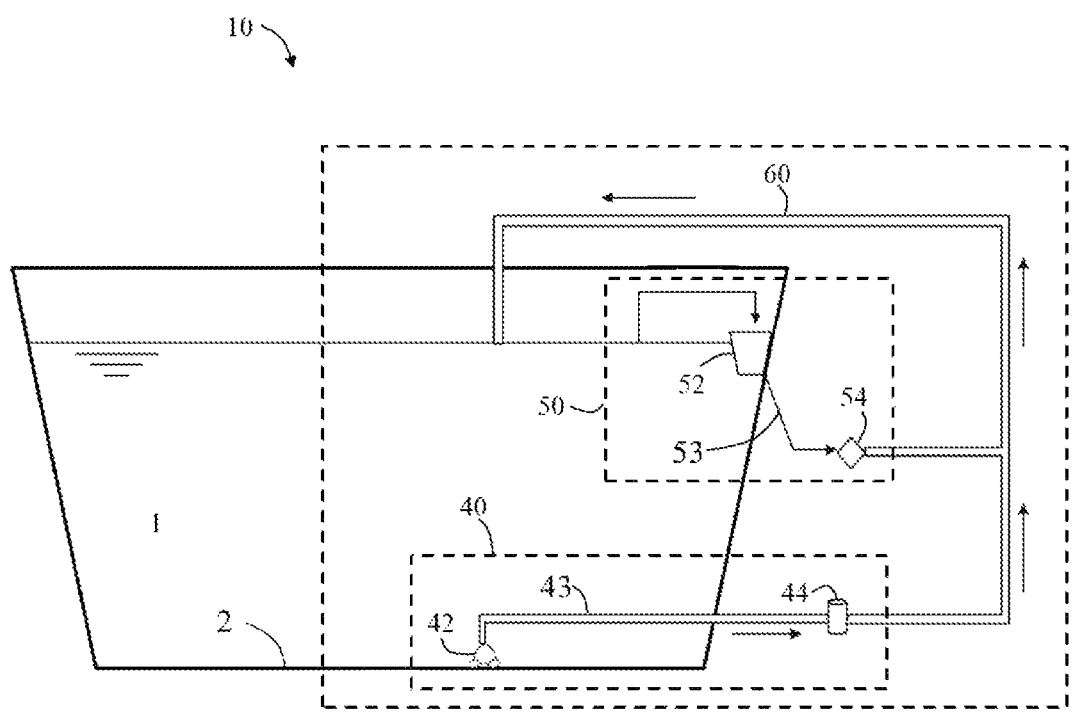
FIG. 4 shows an embodiment of the system of FIG. 2.

FIGS. 2-4 show embodiments of a system 10 and method according to the invention for maintaining water quality in a water body.

In an embodiment, the system 10 includes a control system for maintaining the quality of the water in the water body 1 within predetermined water quality and physicochemical parameters. The control system activates the addition of chemical agents, the removal of impurities from the water, and the removal of greases from the surface water layer based on water quality and physicochemical parameters. The control system is configured to receive information about certain water quality and/or physicochemical parameters, process the information, and initiate processes (e.g., chemical application, suctioning, filtration, and degreasing).

According to an exemplary embodiment shown in FIG. 2, the control system comprises a coordinating assembly 20 that may include a control unit 22, such as a computer, and at least one monitoring device 24, such as a sensor. The sensor may be a turbidity meter or other means for determining turbidity of the water. According to other embodiments, the coordinating assembly 20 may include two or more monitoring devices 24. For example, the coordinating assembly 20 may include a monitoring device for monitoring color, e.g., a colorimeter, used for determining the color of the bottom 2 of the water body 1. The coordinating assembly 20 may also comprise additional monitoring devices 24 for other water quality parameters, such as pH, alkalinity, hardness (calcium), chlorine, and microbial growth.

According to an embodiment, the control system for coordinating the addition of chemical agents and filtration comprises an automated system. The automated system may be programmed to monitor water quality parameters continuously or at pre-set time intervals, and to compare the results to a predetermined value. For example, the automated system may initiate addition of chemical agents for removing impurities from the water, operation of the mobile suction device, and/or operation of the degreasing system upon detecting a crossing of a value. According to an alternative embodiment, the control system comprises manually activating the addition of chemical agents, operation of the mobile suction device, and/or operation of the degreasing system based on a determination of water quality and physicochemical parameters.

The control system may comprise an automated system that can be operated on site or remotely through the internet or other similar information-exchange systems. Such control system allows automatically and operating the processes and activating different systems within different periods of time. According to alternative embodiments, the activation of the processes may be completed by one or more people that manually obtain and/or enter and/or process information, or initiate and/or perform processes for maintaining water quality parameters.

FIG. 3 shows an embodiment of the system where the control system comprises visual or optical inspection of water quality parameters. In the embodiment, water quality and physicochemical parameters can be obtained manually, for example by visual inspection, sensorial methods, algorithms based on experience, or by obtaining a sample and measuring water quality using analytical or empirical methods. For example, the color of the bottom 2 of the water body 1 can be determined by visual inspection by comparing the color of the bottom 2 of the water body 1 to a color palette. The color of the bottom 2 of the water body 1 can be visualized from the surface of the water, or, in particular when turbidity is high (e.g., more than about 7 NTU), by using a transparent peephole attached to a tube that allows visualization of the bottom 2 of the water body 1.

In an embodiment, the system 10 provides for adding chemical agents to the water. According to an embodiment shown in FIG. 2, the system comprises a chemical application system 30. The chemical application system 30 may be automated and may be controlled by the control unit 22 of the coordinating assembly 20. The chemical application system 30 may comprise at least one chemical reservoir, a pump for dosing chemicals, and a dispensing apparatus. The pump may be actuated by a signal from the control unit 22. The dispensing apparatus may comprise any suitable dispensing mechanism, such as an injector, a sprinkler, a dispenser, piping, or combinations thereof.

According to an alternative embodiment, as shown in FIG. 3, the chemical application system 30 may be operated manually based on monitoring of water quality parameters. For example, the water quality parameters can be obtained manually, by empirical or analytical methods, algorithms based on experience, visual inspection, sensorial methods, or by using a sensor, and the information about the water quality parameters can be processed manually or by entering into a processing device (e.g., a computer). Based on the information about the water quality parameters, operation of the chemical application system 30 may be activated manually, e.g., by activating a switch.

In yet another embodiment shown in FIG. 4, chemicals may be dosed manually into the water or by using a separate chemical application mechanism. For example, water quality parameters can be obtained manually, visually, by sensorial methods, algorithms based on experience, or by using a sensor, and the information about the water quality parameters can be processed manually or by entering into a processing device (e.g., a computer). Based on the information about the water quality parameters, chemicals can be manually added into the water.

The system 10 typically comprises a filtration system 40. As seen in the embodiments of FIGS. 2-4, the filtration system 40 includes at least one mobile suctioning device 42 and a filtration unit 44. The mobile suctioning device 42 is configured to suction a portion of water from the bottom 2 of the water body 1 that contains debris, particulates, solids, flocs, and/or other impurities that have settled on the bottom 2. Suctioning and filtering this portion of the water volume in the water body provides the desired water quality without a filtration system that filters the entire water volume of the water body, which is in contrast to conventional swimming pool filtration technologies that require filtering the entire water volume 1 to 6 times per day, have large capital costs, and consume large amounts of energy to complete such filtration requirements.

According to an embodiment, the mobile suctioning device 42 is capable of moving along the bottom 2 of the water body 1. However, to maximize the efficiency of removal of debris, particulates, solids, flocs, and/or other impurities that have settled on the bottom 2, the mobile suctioning device 42 can be configured such that its movement creates minimal dispersion of the settled materials. In an embodiment, the mobile suctioning device 42 is configured and operated to avoid the re-suspension of less than 30% of the settled materials that are found on the bottom. In an embodiment, the mobile suctioning device 42 is configured to not include parts, such as rotating brushes that could function to re-disperse a substantial portion of the settled materials from the bottom 2 of the water body 1 during operation of the suctioning device.

The operation of the mobile suctioning device 42 can be controlled by the control unit 22 or manually by an operator. According to an embodiment shown in FIG. 2, the operation of the suctioning device 42 can be controlled by the control unit 22. In an alternative embodiment shown in FIG. 3, the operation of the suctioning device 42 can be controlled manually by an operator.

The mobile suctioning device 42 may comprise a pump, or a separate pump or pumping station may be provided to suction the water and to pump the suctioned water to the filtration unit 44. The separate pump or pumping station may be located within the large water body 1, along the perimeter of the water body 1, or outside of the water body 1.

It is also considered within the scope of the invention to incorporate a filtration unit directly into the mobile suctioning device 42 itself.

The mobile suctioning device 42 is typically in fluid communication with the filtration unit 44. The filtration unit 44 generally includes one or more filters, such as a cartridge filter, sand filter, micro-filter, ultra-filter, nano-filter, or a combination thereof. The mobile suctioning device 42 is typically connected to the filtration unit 44 by a collecting line 43 comprising a flexible hose, rigid hose, or a pipe, among others. The capacity of the filtration unit 44 is generally scaled to the capacity of the mobile suctioning device 42. The filtration unit 44 filters the water flow from the mobile suctioning device 42, corresponding to a small portion of the volume of water in the water body 1. Filtered water from the filtration unit 44 is returned to the water body 1 by a return line 60 comprising a conduit, which can be a flexible hose, rigid hose, a pipe, an open channel, or a combination thereof. Compared to a conventional centralized filtration system with capacity to filter the entire body of water in a water body 1 to 6 times per day, the filtration unit 44 is generally configured to have a filtration capacity that does not exceed 30% of the total water volume of the water body 1 in a 24 hour interval. Typically, the filtration capacity does not exceed 20% of the total water volume of the water body 1 in a 24 hour interval, and in a preferred embodiment it does not exceed 10% of the total water volume. The energy consumption of the filtration system is roughly proportional to size and, thus, significant costs savings can be expected with lower energy consumption, and requiring smaller equipment for the filtration process.

The system 10 further comprises a degreasing system 50. The degreasing system 50 can be used to separate floating debris and oils and greases from the water. The system 10 can further include a skimmer system hydraulically connected to the degreasing system 50, in order to efficiently purify skimmed water. As shown in FIGS. 2-4, the degreasing system 50 can include a skimmer system 52 that skims the surface water of the water body 1, in fluid connection by a connecting line 53 with a separation unit 54. Because of the different nature and quality of impurities (e.g., oils, greases, and floating debris) in skimmed water as compared to impurities in the bottom 2 of the water body 1, the skimmed water usually does not need to be filtered; however it is considered within the scope of the invention to include a filter in the degreasing system 50. Therefore, according to an embodiment, the separation unit 54 comprises a degreaser (e.g., an over flow apparatus) for separating oils and greases from the water and a screen or coarse filter for separating debris or a conventional filter. Water from the separation unit 54 can be returned to the water body 1 through a return line 60 comprising a flexible hose, rigid hose, a pipe, an open channel, or a combination thereof. The return line 60 may be the same, or may be separate from the return line from the filtration system 40. According to a preferred embodiment, the degreasing system 50 includes multiple skimmers 52 that may be spread out along the perimeter of the water body 1. The skimmers 52 can be evenly spaced along the perimeter such that each skimmer 52 is equidistant from an adjacent skimmer 52, or placed in an uneven pattern, e.g., concentrated in an area of the water body 1 expect to have higher impurities to be skimmed. The skimmers can be placed within the water body, and comprise fixed skimmers, floating skimmers, and self-filtering skimmers.

The skimmers provide a surface water flow to the separation unit. The operation of the degreasing system 50 may be continuous or intermittent depending on the actual needs of the water. For example, operation of the degreasing system 50 can be based on the amount of greases on the surface water layer. In an embodiment, the skimmer system is used to maintain a surface layer of water with less than about 40 mg/L of greases, typically less than about 30 mg/L and preferably less than about 20 mg/L. In an embodiment, the degreasing system 50 is activated before the top-most 1 cm of said surface water layer contains more than about 20 mg/L of floating greases. The operation of the skimming system 50 may be controlled by the control unit 22 (FIG. 2).

Water quality in the water body 1 is typically maintained by adding chemical agents for removing impurities from the water, activating the mobile suctioning device 42 to remove settled impurities from the bottom 2 of the water body, and/or activating the degreasing system 50 to remove oils and greases from the surface water layer according to monitored or observed water quality parameters. Water quality in the water body 1 may be obtained, for example, for specific parameters such as turbidity, color, pH, alkalinity, hardness (Calcium), chlorine, microbial growth, among others. The chemical application system, filtration system, and/or degreasing system can be timely activated by the control system to maintain the water quality parameters within set limits. The systems can be activated based on an actual need (e.g., exceeding a water quality parameter), resulting in the application of smaller amounts of chemicals and using less energy than in conventional swimming pool water treatment methods.

In some embodiments, water bodies of the present invention are considerably larger than conventional swimming pools, and therefore homogeneity may not be achieved throughout the complete water body by using conventional chemical application systems. Large water bodies tend to generate "dead zones" or "stagnant zones" which are not affected by the chemicals due to currents, mixing, winds, or other effects, and which may not present the same conditions as the rest of the water body. The application of additives in the present invention is done such that the water body does not have considerable water quality differences. According to an embodiment, the differences in water quality between two different locations is not higher than 20%, for periods of time longer than 4 hours. The chemical application systems from the present invention comprise injectors, sprinklers, dispensers, manual application, and piping.

In embodiments, water quality parameters can be obtained manually, for example by visual inspection based on experience, by sensorial methods, by using a water quality meter (e.g., a probe such as a pH probe, a turbidity meter, or a colorimeter), or by obtaining a sample and measuring water quality using an analytical method. Information about the water quality parameters can be obtained by or entered into the control system. In an embodiment, an automated control system may be programmed to monitor water quality parameters continuously or at pre-set time intervals, to compare the results to a predetermined parameter and to activate one or more systems when the parameter has been crossed. For example, the automated system may initiate addition of chemical agents, operation of the suctioning device, or operation of the degreasing system upon detecting a crossing of a predetermined parameter. In an alternative embodiment, water quality parameters may be obtained manually or visually through sensorial methods and the information entered into the control system, or the results may be compared to a predetermined value and addition of chemical agents, operation of the suctioning device, and/or operation of the degreasing system may be initiated manually. Chemical agents used to maintain water quality in the water body may comprise any suitable water quality treatment chemicals. For example, the chemical agents may comprise oxidants, flocculants, coagulants, algaecides, sterilizing agents, or pH regulating agents.

The turbidity of the water can be determined by a monitoring device 24 (system of FIG. 2), such as a sensor, by visual inspection, algorithms based on experience, and/or empirical methods (systems of FIGS. 3 and 4). Before the turbidity exceeds a predetermined value, a chemical agent, such as a flocculant, may be added to the water in the water body to promote or induce agglomeration, coagulation, or flocculation of impurities that cause turbidity, such as suspended solids, organic matter, inorganic matter, bacteria, algae, and the like, into particles, or "floccules", which then settle to the bottom of the water body where they can be removed by the mobile suctioning device. In an embodiment, the amount of impurities that have settled onto the bottom of the water body corresponds to an amount of turbidity removed from the water by the flocculant. Some settlement of impurities may also happen naturally without the addition of chemicals.

Generally, the flocculant is applied or dispersed into the water by the chemical application system. The flocculant may comprise a composition with synthetic polymers such as quaternary ammonium-containing polymers and polycationic polymers (e.g., polyquaternium), or other components with flocculant or coagulant properties. Suitable flocculants include but are not limited to multivalent cations (e.g., quats and polyquats); synthetic polymers (e.g., cationic polymers and anionic polymers); aluminum salts, such as aluminum chlorhydrate, alum, and aluminum sulfate; calcium oxide; calcium hydroxide; ferrous sulphate; ferric chloride; polyacrylamide; sodium aluminate; sodium silicate; and some natural agents such as chitosan, gelatin, guar gum, alginates, moringa seeds; starch derivatives; and combinations thereof. In embodiments, the flocculant has algaecide properties which kills and/or prevents the growth of algae in the water body. The use of flocculants having algaecide properties can reduce the amount of chlorine or other disinfectants in the water body, thus reducing chemical consumption and providing a sustainable operation.

In an embodiment, addition of flocculants is initiated before turbidity is equal to or exceeds a predetermined value, such as 2 NTU, 3 NTU, 4 NTU, or 5 NTU. The control system may be used to initiate the addition of flocculants before turbidity of the water exceeds a predetermined value in order to cause the flocculation and settling of organic and inorganic matter. Typically an effective amount of flocculant is added to the water to prevent the turbidity from exceeding the 2 NTU. The fraction of water in which the floccules collect or settle is generally the layer of water along the bottom of the water body. The floccules settle at the bottom 2 of the water body 1 and can then be removed by the mobile suctioning device 42 without requiring that all of the water in the water body 1 be filtered, e.g., only a small fraction is filtered. The "small fraction" of water being filtered is preferably less than about 10% of the total water volume of the water body in a 24 hour interval. In an embodiment, the small fraction of water being filtered is less than about 20% of the total water volume of the water body in a 24 hour interval. In another embodiment, the small fraction of water being filtered is preferably less than about 30% of the total water volume of the water body in a 24 hour interval. The amount of flocculant added to the water can be predetermined or can be calculated (e.g., by the control device 22 in FIG. 2 or manually as shown in FIGS. 3 and 4) based on the turbidity and the desired reduction in turbidity of the water. Because the volume of the body of water is large, different operating conditions may be used for the filtration system. In an embodiment, the filtration system is operated at the same time as the suctioning device and filtered is returned water to the water body continuously.

The color of the bottom of the water body can have a significant influence on the coloration of the water, providing an aesthetically appealing coloration to the water in the water body. The bottom of the water body typically has a color that lends an aesthetically pleasing color and appearance to the water in the water body. For example, the bottom 2 of the water body 1 may have a colored material with a white, yellow or blue color, among other colors. The settling of particulates, solids, flocs, and/or other impurities to the bottom of the water body may cause a change in the appearance of color of the bottom of the water body. For example, the settled impurities can make the color of the bottom 2 of the water body 1 appear darker than the original color. As the settled impurities collect on the bottom 2 of the water body 1, the color of the bottom 2 will become darker and thus the coloration of the bottom 2 will not be visible.

According to one method of the present invention, the operation of the suctioning device 42 is activated when the color of the bottom of the water body exceeds a predetermined value. In an exemplary embodiment shown in FIG. 2, the color of the bottom 2 of the water body 1 is measured by a monitoring device 24 (e.g., a colorimeter) of the coordinating assembly 20. If the measured or perceived color of the bottom 2 of the water body 1 exceeds a predetermined value, the operation of the mobile suctioning device 42 is initiated by the control unit 22 of the coordinating assembly 20. For example, a pump of the mobile suctioning device 42 can be actuated by a signal from the control unit 22. In this way, the mobile suction device 42 is operated only when needed based on the actual need for filtration or purification dictated by the quality of the water (e.g., an amount of settled impurities causing the color measurement to exceed the predetermined value) rather than a pre-set schedule.

In an exemplary embodiment, the color of the bottom of the water body can be monitored for changes in the black component on a CMYK. The CMYK color scale uses four colors expressed in percentages: cyan, magenta, yellow and black. The K-component of the CMYK scale is the black component of the color. For example, a color with CMYK 15%, 0%, 25%, and 36% represents a color with 15% cyan, 0% magenta, 25% yellow, and 36% black component. The black component of the bottom of the water body can be assessed by visually comparing the bottom color of the water body with standard CMYK charts or color palettes, by sensorial methods, empirical methods or algorithms based on experience, and determining the black component according to the percentage found in the CMYK chart.

Alternative color scales, such as the L*a*b* (or "Lab") scale, can also be used. In the L*a*b* scale, color is measured on three axis, L, a, and b, where the L-axis measures lightness. An L-value of 100 indicates white and L=0 indicates black. Thus, if the actual or original color of the bottom of the water body has, for example, an L-value 75, the second value can be experimentally set at some lower L-value, such as L=50. For example, when impurities settle on the bottom 2 of the water body 1 and before the perceived color of the bottom 2 reaches L=50, the operation of the suctioning device 42 can be initiated.

According to an embodiment shown in FIG. 2, the color of the bottom 2 of the water body 1 is monitored by using a monitoring device 24, such as a colorimeter. According to an alternative embodiment shown in FIGS. 3 and 4, the color of the bottom 2 of the water body 1 is monitored by visual inspection and/or by comparing the color to a comparison chart or color palette. In yet another embodiment, the color of the bottom 2 of the water body 1 can be visualized from the surface of the water, or, in particular when turbidity is high (e.g., more than about 7 NTU), by using a transparent peephole attached to a tube that allows visualization of the bottom 2 of the water body 1. A visual inspection can also be conducted through, e.g., a strategically placed camera allowing for remote analysis of the bottom 2 of the water body 1.

The bottom of the water body ordinarily has a color that lends a pleasing color and appearance to the water in the water body. For example, the bottom 2 of the water body 1 comprises a non-porous flexible membrane that may have a colored material such as white, yellow or blue. In an exemplary embodiment, the color of the bottom 2 of the water body 1 is measured by a monitoring device 24 (e.g., a colorimeter) of the control assembly 20. The perceived color of the bottom 2 of the water body 1 can be compared to its actual, original or desired color by empirical or analytical methods, such as algorithms based on experience, visual inspection, sensorial methods, comparison with color guides, colorimeters, spectrophotometers, and others.

The operation of the mobile suctioning device 42 can be activated through the control system. In an embodiment shown in FIG. 2, the operation of the mobile suctioning device 42 can be activated by the control unit 22. In other embodiments shown in FIGS. 3 and 4, the operation of the mobile suctioning device 42 can be activated manually.

According to an embodiment, before an increase in the measured or perceived color of the bottom of the water body exceeds a predetermined value (such as black component equals about 30% on a CMYK scale (or other suitable color scale)), the operation of the mobile suctioning device 42 can be initiated by the control unit 22 of the coordinating assembly 20. The increase in the black color component can be compared to its actual, original or desired color. For example, a pump of the mobile suctioning device 42 can be actuated by a signal from the control unit 22. The color of the bottom of the water body can be further monitored and compared to another predetermined value to determine an end point of the operation of the suctioning device 42. For example, if the black component of the color of the bottom 2 of the water body 1 decreases below the predetermined value, the operation of the suctioning device 42 is discontinued. The predetermined value may be, for example, where the black component is 10%-units above value of the black component of the actual color of the bottom 2, or 5 units above, or 3 units above. For example, if the original color of the bottom 2 on the CMYK scale is 15%, 0%, 25%, 10% (the black component being 10%), the predetermined value can be set at 20% black, 15% black, or 13% black. Alternatively, the predetermined value may be predetermined based on the actual color of the bottom 2 of the water body 1 and the desired level of cleanliness of the water body 1.

In one embodiment, each parameter has predetermined values, and the appropriate corrective measure is taken (e.g., addition of additives or activation of the suctioning device 42) to adjust the water quality and maintain such parameters within their predetermined ranges or values. The corrective measure can be activated for a predetermined period of time, or until the parameters are adjusted. For example, if the turbidity has a predetermined value of 2 NTU, flocculants and other additives can be added to the water and the value re-determined until the value reaches 2 NTU or lower.

In an embodiment, the method is applied to different zones within a water body, such as bathing zones. In this embodiment, different areas of the water body can have different predetermined values. For example, in one area, the turbidity is adjusted to be less than 2 NTU, respectively, while a second area may have maximum value of 3 NTU. By having different maximum values for different areas, it is possible to maintain higher water quality in predetermined areas, for example, in areas designated for bathing, i.e., bathing zones, while allowing for slightly lower water quality levels in other areas.

The development of different water quality zones can be accomplished by determining the water quality parameters in each zone, as described herein, and comparing the determined parameter in each zone to the maximum predetermined value of that zone and applying the appropriate activity (e.g., adding flocculant, starting one or more skimmers and/or activating the suctioning device 42) only in the zone requiring such activity.

The system 10 and method of the present application provide the benefits of a smaller and more cost-efficient filtration system as compared to a conventional centralized filtration system and cheaper, more energy efficient operation. By using the system 10 and method of the present application, the scale and operation of the filtration system can be determined by actual water quality parameters and, therefore, by actual need for filtration or purification as described herein, rather than a pre-set schedule of 1 to 6 pool volumes per day regardless of real need. According to exemplary embodiments, a filtration system with a capacity up to 60 times smaller than conventional systems may be used. Compared to a conventional filtration system with capacity to filter the entire body of water in the pool 6 times per day, the system of the present application can be configured to have a filtration capacity that is 1/60 of the conventional system, or capacity to filter 1/10 (one tenth—10%) of the water body's volume per day. According to alternative embodiments, the system can be configured to a filtration capacity that is capable of filtering up to 1/5 (one fifth—20%) of the water body's volume per day or more. The energy consumption of the filtration system is roughly proportional to size and, thus, significant energy savings can be expected when the filtration system is operated according to the present method.

EXAMPLES

The following examples are illustrative, and other embodiments exist and are within the scope of the present invention.

Example 1

The filtration needs of a large water body with a surface area of 2.2 ha (approximately 5.5 acres) and water volume of approximately 55,000 m$^3$ (approximately 1,950,000 cubic feet or 14.5 million gallons) was studied by comparing a theoretical conventional filtration system with the method according to the present application. In the conventional filtration system, water drawn from the main body of water, the bottom of the artificially built water body, and surface water drawn by a skimmer system are all sent through a centralized filtration system sized for filtering the complete water volume 4 times per day.

In the method according to the present application, the water quality is maintained based on the different water quality parameters, where the parameters are determined by algorithms or based on experience and operated to maintain such parameters within its limits. Also, only the water from the bottom of the water body is sent through a filtration system. Surface water drawn from the degreasing system is sent through a degreaser and screens to eliminate oil, grease and floating debris. Table 4 shows the calculated filtration capacity, filter size and energy consumption for each system.

TABLE 4

Comparison of Filtration Systems

| Parameter | Conventional Swimming Pool Filtration Equipment | Method of the Present Application |
|---|---|---|
| Water Surface Area (m$^2$) | 22,000.00 | 22,000.00 |
| Total Water Volume (m$^3$) | 55,000.00 | 55,000.00 |
| Requirement for filtration of complete water body | Filtering complete water body 4 times per day | — |
| Filtration Water Flow (m$^3$/h) | 9,167 | 90.0 |
| Required Filter Size (m$^2$) | 284.36 | 1.78 |
| Monthly Electricity Consumption (kWh) | 18,067.38 | 177.39 |

According to this example, the area utilized by the conventional centralized filtration system is more than 150 times larger than the area required by the filtration system of the present method, and the monthly energy consumption is about 100 times greater. As demonstrated by this Example, the present method allow for the use of much smaller, cost and energy efficient filtration systems for maintenance of water quality in water bodies.

Example 2

The method of the present application was applied to a large recreational lagoon with a surface area of about 9,000 m² and a volume of about 22,500 m³. The lagoon was equipped with a suctioning device capable of suctioning water and settled impurities from the bottom of the lagoon having a flow rate of about 25 L/s, and 22 skimmers around the perimeter of the lagoon each having a flow rate of about 2.2 L/s. Water from the suctioning device was sent to a filtration system to remove impurities, and filtered water was returned into the lagoon. The filtration system was equipped with a QMA 180 filter having a diameter of 1.8 m. Water from the skimmers was sent through a degreaser and screens to remove floating debris. Purified water was returned back into the lagoon.

The color of the bottom of the lagoon was visually inspected and was assessed against a CMYK color palette by an experienced technician. Turbidity was initially determined to be 0.55 NTU using a turbidimeter. Before turbidity exceeded 2 NTU, addition of treatment chemicals was initiated. The treatment chemical used was a cationic polymer flocculant that was added to achieve a concentration in the range of 0.02-1.0 ppm. After addition of the flocculant, the impurities causing turbidity agglomerated and settled to the bottom of the pool.

Sodium Hypochlorite was added to the water and a minimum residual concentration of 0.4 ppm was maintained. The minimum residual chlorine level was obtained by performing a series of experiments that involved measuring the microbiological count of the water for different residual chlorine levels until acceptable levels were achieved. It is important to note that the minimum residual chlorine level was not lower than the value resulting from the equation as follows:

$$\text{Minimum Free Residual Chlorine Level} = 0.3 - 0.002(WQI - 100) \text{ ppm}$$

It must be noted that such minimum free residual chlorine level is lower than for conventional swimming pools, due to the large water volumes that allow providing an additional dilution effect and since the minimum free residual chlorine level is based on the WQI which assesses water quality parameters applicable to large water bodies.

The color of the bottom of the pool was again visually inspected to estimate the color black component. As an increase in the black color component approached 30% on the CMYK scale, operation of the suctioning device was initiated. The color of the bottom was further monitored, and suctioning was discontinued when the deviation in color black from the original color of the bottom was down to about 3%-units. At the same time, surface water was drawn by the skimmers and was cleaned of grease and floating debris. The method was applied to the bathing zones of the water body while such zones were in use.

To maintain an appropriate water quality for recreational use, the filtration needs, compared to the same size pool filtered with conventional centralized filtration, were as follows:

TABLE 5

| Example 2 Filtration Needs | |
| --- | --- |
| Filtration of the water from the suctioning device | 25 L/s |
| Purification of surface water from skimmers (not filtered) | 46 L/s |
| Total filtration requirement | 25 L/s |

TABLE 5-continued

| Conventional Centralized Filtration System | |
| --- | --- |
| Filtration of complete body of water two times per day | 521 L/s |
| Purification of surface water from skimmers (filtered) | 46 L/s |
| Total filtration requirement | 567 L/s |

The filtration need when using the present method was only 25 L/s when filtration was based on monitoring actual water quality parameters. The filtration need using a conventional centralized filtration system for the same size pool, configured to filter the entire body of water two times per day (turnover rate of 12 hours) was 567 L/s, which is about 23 times higher.

While certain embodiments of the invention have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, substitutions, additions, modifications, and equivalents thereof which, after reading the description herein, may suggest themselves to one of ordinary skill in the art without departing from the spirit of the present invention or the scope of the claimed subject matter.

What is claimed is:

1. A method for treating large water bodies for recreational uses, including large artificial excavated or floating structures with bottoms comprising flexible membranes, wherein the method comprises:
    (a) applying an effective amount of a flocculant to water in the water body to maintain turbidity of the water below 2 NTU, wherein the flocculant flocculates suspended solids in the water into particles that settle to the bottom of the water body;
    (b) monitoring to determine the color of the bottom of the water body, receiving information regarding the color of the bottom and activating a mobile suctioning device to adjust the color within a set limit by suctioning settled particles from the bottom of the water body;
    (c) operating the mobile suctioning device to maintain an increase in a black component of the color of the bottom below 30% based on the CMYK scale, wherein the mobile suction device moves on the bottom of the water body and suctions a portion of water from the bottom of the water body containing settled particles, wherein the device is capable of moving and cleaning at a rate of 10,000 m² per 24 hours, and wherein operating the mobile suctioning device does not re-suspend more than 30% of the settled particles in the area on the bottom of the water body cleaned by the mobile suction device;
    (d) filtering the water suctioned by the mobile suction device and returning the filtered water to the water body, wherein the water suctioned by the mobile suction device does not exceed 10% of the total water volume of the water body in a 24 hour interval; and
    (e) operating a degreasing system to maintain a surface water layer having less than about 20 mg/L of floating greases within a top-most 1 cm of the surface water layer, wherein greases from the surface water layer flow into the degreasing system and are removed by a separation unit comprising a degreaser, and the water that has passed through the degreaser is returned to the water body.

2. The method of claim 1, further comprising adding a chlorine-based additive to maintain at least a minimum free residual chlorine level in the water, where the minimum free residual chlorine level is at least the value resulting from the following equation:

Minimum Free Residual Chlorine Level=(0.3−0.002 (WQI−100))ppm.

3. The method of claim 1, wherein the water body has a surface area of at least 7,000 m$^3$.

4. The method of claim 1, wherein the flexible membrane has a thickness between about 0.1 mm and about 5 mm.

5. The method of claim 1, wherein the flexible membrane comprises rubber, plastic, Teflon, low density polyethylene, high density polyethylene, polypropylene, nylon, polystyrene, polycarbonate, polyethylene terephthalate, polyamides, PVC, acrylics, or a combination thereof.

6. The method of claim 1, wherein the suctioning device is supported over brushes to avoid damaging the bottom of the artificially constructed structures.

7. The method of claim 1, wherein the suctioning device is a self-propelled device.

8. The method of claim 1, wherein the suctioning device allows concentration of suctioning power at suction points distributed along the bottom of the device, therefore providing higher suctioning efficiency and avoiding re-suspending the settled materials and debris found on the bottom.

9. The method of claim 1, further comprising receiving information regarding the turbidity of the water and applying flocculants to adjust the turbidity below a set limit.

10. The method of claim 1, wherein the turbidity is determined by empirical methods, analytical methods, or algorithms based on experience.

11. The method of claim 1, wherein a control system activates the application of additives, the operation of the suctioning device, and the operation of the degreaser system.

12. The method of claim 11, wherein the control system is an automated system that processes information.

13. The method of claim 11, wherein the control system may be operated on site.

14. The method of claim 11, wherein the control system may be operated remotely through an interne connection or other information-exchange system.

15. The method of claim 11, wherein the control system receives information regarding the turbidity of the water and activates the flocculant application to adjust the turbidity within a set limit.

16. The method of claim 1, wherein the flocculant comprises synthetic polymers comprising quaternary ammonium-containing polymers or polycationic multivalent cations; aluminum salts; calcium oxide; calcium hydroxide; ferrous sulphate; ferric chloride; polyacrylamide; sodium aluminate; sodium silicate; natural agents comprising chitosan, gelatin, guar gum, alginates, or moringa seeds; starch derivatives; or combinations thereof.

17. The method of claim 1, wherein flocculant comprises algaecide properties.

18. The method of claim 1, wherein the flocculant is dispensed into the water by a chemical application system comprising at least one selected from the group consisting of injectors, sprinklers, dispensers, manual application, and piping.

19. The method of claim 2, further comprising receiving information regarding the free residual chlorine level in the water.

20. The method of claim 2, wherein the minimum free residual chlorine level is determined by empirical methods, analytical methods, or algorithms based on experience.

21. The method of claim 2, wherein a control system activates the chlorine-based additive application.

22. The method of claim 2, wherein the chlorine-based additive is dispensed into the water by a chemical application system comprising at least one selected from the group consisting of injectors, sprinklers, dispensers, manual application, and piping.

23. The method of claim 18, wherein the chemical application system is disposed to provide homogeneity to the water body, wherein water quality between two different locations differs less than 20% for periods of time longer than 4 hours.

24. The method of claim 1, further comprising receiving information regarding the color of the bottom of the water body and activating the mobile suctioning device to adjust the color within a set limit by suctioning settled particles from the bottom of the water body.

25. The method of claim 1, wherein the color is determined by an empirical methods, sensory methods, analytical methods, or algorithms based on experience.

26. The method of claim 1, wherein the color of the bottom of the structure is determined using a colorimeter.

27. The method of claim 1, wherein operation of the mobile suctioning device is activated based on an amount of impurities that have settled onto the bottom of the water body and affect the color of the bottom, the amount of settled impurities corresponding to an amount of turbidity removed from the water.

28. The method of claim 11, wherein the control system receives information regarding the color of the bottom of the water body and activates the operation of a suctioning device to adjust the color within a set limit.

29. The method of claim 11, wherein the control system receives information regarding amount of floating greases and activates the operation of the degreasing system to adjust the amount of floating greases within a set limit.

30. The method of claim 1, wherein the degreasing system comprises skimmers to provide the surface water flow into the separation unit.

31. The method of claim 1, wherein the degreaser comprises an overflow apparatus for separating oils and greases from the water.

32. The method of claim 1, wherein the degreasing system comprises one or more screens for retaining large debris and a degreaser for separating water from oils and greases through overflow.

33. The method of claim 1, wherein the degreasing system comprises a filter.

34. The method of claim 1, wherein the method is applied to a bathing zone within the water body.

35. The method of claim 2, wherein the minimum residual chlorine level is maintained continuously within the water body.

36. The method of claim 2, wherein the minimum residual chlorine level is maintained for a period of time within the water body.

37. The method of claim 2, wherein the minimum residual chlorine level is maintained when the water body is in use.

38. The method of claim 1, wherein the impurities comprise suspended solids, organic matter, inorganic matter, bacteria, or algae.

39. The method of claim 1, wherein the water body comprises an excavated structure having a bottom and walls to contain the water and a non-permeable flexible membrane covering the bottom of the water body, the bottom having a slope that is about 20% or less and the walls having a slope that is greater than about 45%.

40. The method of claim 39, wherein soil forming the bottom of the excavated structure is compacted soil, the soil being compacted to at least 80% of its relative density (RD) if a passage rate of the soil forming the bottom of the excavated structure through N°200 mesh is less than 12%.

41. The method of claim 39, wherein soil forming the bottom of the excavated structure is compacted soil, the soil being compacted to at least 85% of its maximum dry density (MDD) if a passage rate of the soil forming the bottom of the excavated structure through N°200 mesh is greater than 12%.

42. The method of claim 1, wherein the bottom comprises a colored material with a white, yellow, or blue color.

\* \* \* \* \*